Nov. 28, 1961  E. F. HEAGLER ET AL  3,011,012
SHIELDED ELECTRICAL LEADS
Filed Jan. 20, 1958

Ellis F. Heagler,
Peter L. Bellaschi,
Inventors.
Koenig and Pope,
Attorneys.

United States Patent Office 3,011,012
Patented Nov. 28, 1961

3,011,012
SHIELDED ELECTRICAL LEADS
Ellis F. Heagler, St. Louis, Mo., and Peter L. Bellaschi, Portland, Oreg., assignors to Moloney Electric Company, St. Louis, Mo., a corporation of Delaware
Filed Jan. 20, 1958, Ser. No. 710,144
6 Claims. (Cl. 174—127)

This invention relates to shielded electrical leads and more particularly to the shielding of leads of high voltage electrical apparatus.

Among the several objects of this invention may be noted the provision of shielded high voltage leads which materially reduce the voltage gradients in the insulation of high voltage apparatus, such as transformers, breakers, capacitors, and the like; the provision of such leads which permit reduction in spacing and clearances in high voltage apparatus and an accompanying decrease in the over-all size of the apparatus; the provision of leads of the class described in which the strap conductor of a high voltage winding may be extended intact without joints, or breaks in turn insulation to a high voltage bushing; and the provision of shielded high voltage leads which permit the incorporation of high safety factors in the design of high voltage apparatus. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a vertical cross section of a high voltage transformer incorporating a shielded lead structure of the present invention;

Corresponding reference characters indicate corresponding parts throughout the several views of the drawings.

Figure 1:
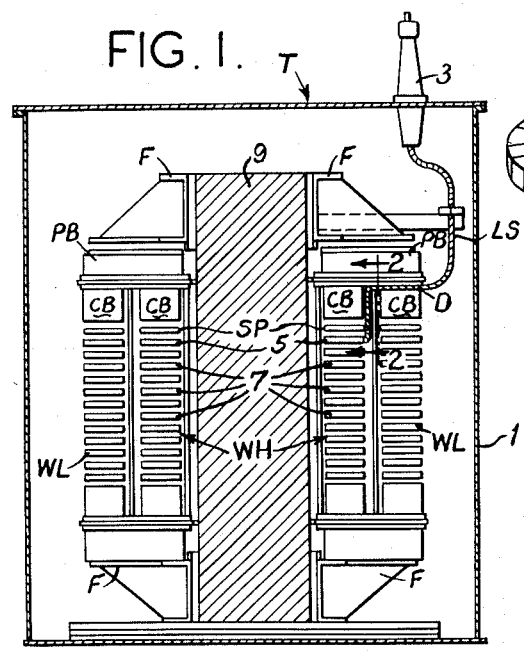

In the design and construction of high voltage apparatus such as transformers, capacitors, breakers, etc., the placement of high voltage leads, especially that of terminal leads of internal windings of transformers passing through high voltage and stay-back spaces presents substantial problems of gradient stresses and insulation. As minimum clearances permit more compact design and reduce cost of equipment, shipment and installation, the reduction in these critical clearances will result in increased quality and safety factors and decreased cost. One example of the utility and advantages of the present invention is in the production of high voltage transformers. The high voltage windings of such transformers are usually constituted by a strap conductor of generally rectangular cross section and a thickness dependent on the power or kva. ratings of the transformed. In the high voltage classes, such as above 66 kv., and at relatively low power ratings, design considerations dictate the use of a conductor that is quite thin relative to its width, say, ⅝" wide and perhaps only 0.1" thick. The routing of the terminating leads from such windings through high voltage and stay-back spaces to the points of connection to the high voltage bushings inside the usual oil-filled tank presents substantial corona and dielectric breakdown problems.

In accordance with the present invention, a high voltage lead structure is provided which permits significant and substantial reduction in spacing requirements without the need for making joints in the strap conductor or breaking the turn insulation; and without exceeding conservative voltage gradients established for the usual solid (e.g., paper) and liquid (e.g., insulating oil) insulations used in such apparatus.

Referring now to the drawings, a high voltage transformer is indicated at reference character T and includes a conventional grounded metal tank 1, which is substantially filled with an insulating oil. A high voltage bushing 3 is mounted in the cover or top of tank 1 and has its interior terminal interconnected by means of a high voltage shielded electric lead structure LS to the upper end, or line coil 5, of a high voltage winding WH made up of the usual stack of pancake or circular coils 7 separated by rings and spacers from a similarly constructed outside low voltage winding WL. The windings WH and WL are held in a fixed position around a winding leg 9 of a laminated transformer core by means of framing F, pressure blocks PB, and insulating coil blocks CB.

Figure 4:
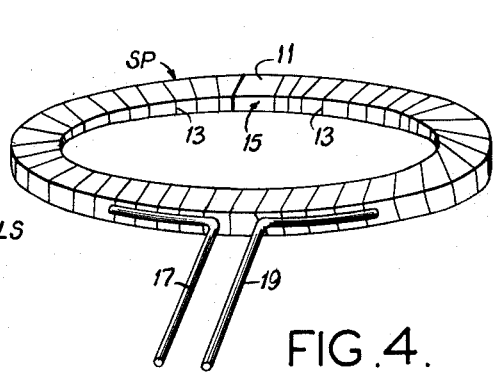
FIG. 4 is a perspective of a static plate of the high voltage transformer with the insulation removed; and, FIG. 5 is a chart illustrating important spatial interrelationships between certain components of the shielded leads of the present invention.
Figure 2:
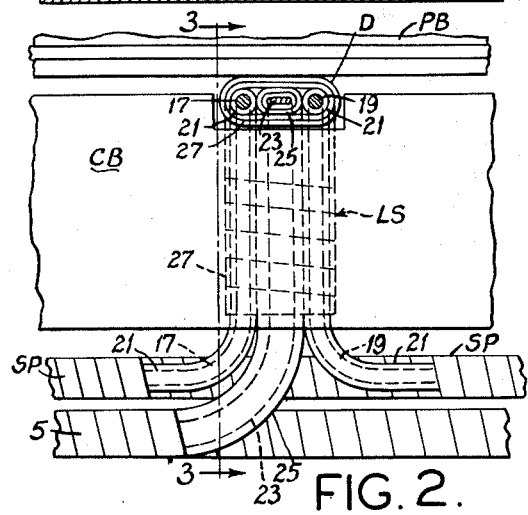
FIG 2 is an enlarged cross section taken on line 2—2 of FIG. 1 illustrating the connection of one end of such a shielded lead structure to a high voltage transformer winding and a static plate.
Figure 3:
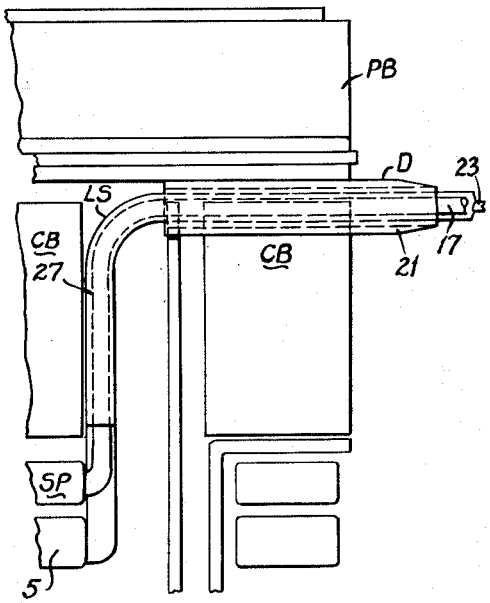
FIG. 3 is a section taken on line 3—3 of FIG. 2.

A grading ring or static plate SP is positioned between coil blocks CB and line coil 5. Plate SP, illustrated in additional detail in FIG. 4, is formed of a ring 11 of insulating material such as pressboard wrapped with conductive metallic ribbon 13 around the major portion of its periphery. A gap between the beginning and the end of ribbon winding 13 is left as indicated at 15 and opposite this gap two shielding conductors 17 and 19 of curvilinear cross section (preferably circular as shown) are electrically connected and mechanically affixed to the winding 13, such as by brazing. The metallic winding 13 of plate SP is covered by solid insulation, such as by wrapping it with crepe paper, and leads 17 and 19 are similarly insulated by a wrapping of crepe paper as indicated at numeral 21.

Line coil 5, as well as the other circular stacked windings that make up the high voltage winding WH, are wound with strap conductors, the dimensions of which are dictated by the kv. class and the kva. rating. An exemplary conductor would have a width of .625" and a thickness of .1". One terminating end 23 of the strap conductor extends from line coil 5 and must be routed through the high voltage and stay-back spaces to its connection with the interior end of high voltage bushing 3. This strap conductor 23, preferably wrapped with crepe paper insulation 25, is provided with a shielding conductor at each of its opposite edges by bending 17 and 19 to be parallel and contiguous with these edges of conductors 23. The high voltage lead structure LS, therefore, is constituted by the strap conductor 23 (with two layers of insulation 25 wrapped therearound), shielding conductors 17 and 19 spaced away (and insulated by paper wrappings 21) from the opposite edges of strap conductor 23, and an outside layer of crepe paper insulation 27 wrapping the bundle of insulated conductors 17, 23 and 19 thereby formed. The horizontal reach of lead structure LS is carried through the stay-back space by passing it through an insulated duct D positioned in a channel formed in the upper surface of the coil blocking CB for the low voltage winding WL. The conductors 17, 19 and 23 are electrically connected to to a common voltage point, the lower terminal of bushing 3, and having a thickness or diameter (e.g., .25") exceeding the thickness of strap conductor 23.

The high voltage lead structure LS provides a greater safety factor in the design of the transformer and/or permits a decrease in the spacing of various components of the unit without exceeding the permissible voltage gradients in the insulation. Thus, the permissible voltage that can be safely applied to the lead structure LS may be increased materially and/or the voltage gradients both in the solid insulation and in the oil may be reduced substantially, relative to the values which would be obtained if conductor 23 were not shielded by the adjacent conductors 17 and 19.

Figure 5:
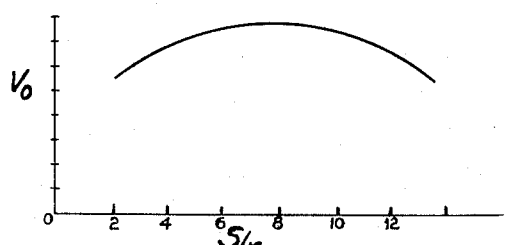

As has been found in accordance with our invention there is a relationship between the amount of spacing between the opposing surface of conductors 17 and 19 and the permissive voltage which lead structure LS will withstand without dielectric breakdown. This relationship is shown graphically in FIG. 5 where the $V_0$, the permissive voltage, is plotted along the ordinate and the ratio $S/r$ is plotted on the abscissa; S representing the distance between the opposing surfaces of the shielding conductors 17 and 19, and $r$ representing the radius of the conductors 17 and 19. As will be noted, there is an optimum relationship of $V_0$ to $S/r$ at a value of approximately 8, although significant improvement in $V_0$ is obtained between ratios of about 2½ to 12. At an $S/r$ value of 8 the permissive value $V_0$ will be in the order of 40% greater than that of an insulated strap conductor without the shielding conductors 17 and 19.

It is to be understood that strap conductor 23 may comprise a plurality of conductors, braided or otherwise held together, and that it need not be insulated. Shield conductors 17 and 19 may also be uninsulated and may be touching or spaced away from strap conductor 23, and shielding conductors in addition to 17 and 19, positioned contiguous the opposite surfaces of 23 may be used. A significant improvement in the permissive voltage $V_0$ will be attained if the cross sections of shield conductors 17 and 19 are a curvilinear shape other than round. It is to be noted that this high voltage lead structure LS is useful not only where it is used as a takeout lead from a transformer winding or an electrical terminal, but also in any structure where the routing of high voltage leads presents problems of gradient stresses.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In high voltage apparatus, a high voltage lead structure comprising a strap conductor substantially rectangular in cross section and having two longitudinal edges, and a pair of shielding conductors, one of said shielding conductors being circular in cross section and spaced from but substantially parallel to and contiguous one of said strap conductor edges, said other shielding conductor being circular in cross section and spaced from but substantially parallel to and contiguous the other of said strap conductor edges, said shielding and strap conductors being coplanar, said shielding conductors each having a diameter greater than the thickness of said strap conductor, the opposing surfaces of said shielding conductors being spaced apart a distance at least approximately 2½ times the radius of each of the shielding conductors, all of said conductors being electrically connected to a common voltage point.

2. In high voltage apparatus, a high voltage lead structure comprising a strap conductor substantially rectangular in cross section and having two longitudinal edges, and a pair of shielding conductors, one of said shielding conductors being circular in cross section and spaced from but substantially parallel to and contiguous one of said strap conductor edges, said other shielding conductor being circular in cross section and spaced from but substantially parallel to and contiguous the other of said strap conductor edges, said shielding and strap conductors being coplanar, said shielding conductors each having a diameter greater than the thickness of said strap conductor, the opposing surfaces of said shielding conductors being spaced apart a distance not less than approximately 2½ times and not more than about 12 times the radius of each of said shielding conductors, each of said conductors being covered with solid insulation, all of said conductors being electrically connected to a common voltage point.

3. In a high voltage apparatus as set forth in claim 2, a high voltage lead structure in which each of said conductors comprising said lead structure is individually covered with solid insulation.

4. In a high voltage apparatus as set forth in claim 3, a high voltage lead structure in which said insulation for each of said conductors comprises an individual wrapping of crepe paper and the assembled wrapped conductors are additionally insulated by a wrapping of crepe paper.

5. In high voltage apparatus, a high voltage lead structure comprising a strap conductor substantially rectangular in cross section and having two longitudinal edges, and a pair of shielding conductors, one of said shielding conductors being circular in cross section and spaced from but substantially parallel to and contiguous one of said strap conductor edges, said other shielding conductor being circular in cross section and spaced from but substantially parallel to and contiguous the other of said strap conductor edges, said shielding and strap conductors being coplanar, said shielding conductors each having a diameter greater than the thickness of said strap conductor, the opposing surfaces of said shielding conductors being spaced apart a distance not less than approximately 2½ times and not more than about 12 times the radius of each of said shielding conductors, all of said conductors being electrically connected to a common voltage point.

6. In high voltage apparatus, a high voltage lead structure comprising a strap conductor substantially rectangular in cross section and having two longitudinal edges, and a pair of shielding conductors, one of said shielding conductors being circular in cross section and spaced from but substantially parallel to and contiguous one of said strap conductor edges, said other shielding conductor being circular in cross section and spaced from but substantially parallel to and contiguous the other of said strap conductor edges, said shielding and strap conductors being coplanar, said shielding conductors each having a diameter greater than the thickness of said strap conductor, the opposing surfaces of said shielding conductors being spaced apart a distance of approximately 8 times the radius of each of said shielding conductors, all of said conductors being electrically connected to a common voltage point.

References Cited in the file of this patent

UNITED STATES PATENTS

| | | |
|---|---|---|
| 1,263,941 | Schmidt | Apr. 23, 1918 |
| 1,511,694 | Weed | Oct. 14, 1924 |
| 2,180,722 | Rust | Nov. 21, 1939 |
| 2,912,480 | Johnston et al. | Nov. 10, 1959 |

FOREIGN PATENTS

| | | |
|---|---|---|
| 219,804 | Germany | Mar. 9, 1910 |
| 414,713 | Great Britain | Aug. 9, 1934 |